United States Patent
Mcschooler

(10) Patent No.: US 11,636,183 B2
(45) Date of Patent: Apr. 25, 2023

(54) AUTOMATED PIRACY DETECTION

(71) Applicant: DISH Technologies L.L.C., Englewood, CO (US)

(72) Inventor: Jeffrey Mcschooler, Englewood, CO (US)

(73) Assignee: DISH Technologies L.L.C., Englewood, CO (US)

( * ) Notice: Subject to any disclaimer, the term of this patent is extended or adjusted under 35 U.S.C. 154(b) by 187 days.

(21) Appl. No.: 16/730,235

(22) Filed: Dec. 30, 2019

(65) Prior Publication Data

US 2020/0210552 A1 Jul. 2, 2020

Related U.S. Application Data

(60) Provisional application No. 62/786,542, filed on Dec. 30, 2018.

(51) Int. Cl.
*G06F 21/10* (2013.01)
*H04N 21/4627* (2011.01)
*G06F 21/16* (2013.01)
*H04N 21/442* (2011.01)

(52) U.S. Cl.
CPC ............ *G06F 21/105* (2013.01); *G06F 21/16* (2013.01); *H04N 21/44236* (2013.01); *H04N 21/4627* (2013.01)

(58) Field of Classification Search
CPC ......... G06F 21/10; G06F 21/16; G06F 21/105
See application file for complete search history.

(56) References Cited

U.S. PATENT DOCUMENTS

| | | | | |
|---|---|---|---|---|
| 5,668,603 A | * | 9/1997 | Copeland | G11B 20/00094 |
| | | | | 348/E7.024 |
| 2002/0156744 A1 | * | 10/2002 | Senoh | G06F 21/53 |
| | | | | 705/59 |
| 2002/0164047 A1 | * | 11/2002 | Yuval | G06F 21/10 |
| | | | | 382/100 |
| 2002/0168069 A1 | * | 11/2002 | Tehranchi | H04N 5/913 |
| | | | | 380/235 |
| 2004/0190716 A1 | * | 9/2004 | Nelson | H04N 5/74 |
| | | | | 380/54 |
| 2004/0247120 A1 | * | 12/2004 | Yu | H04N 21/23892 |
| | | | | 375/E7.018 |
| 2008/0256647 A1 | * | 10/2008 | Kim | G06F 21/10 |
| | | | | 726/32 |
| 2014/0219495 A1 | * | 8/2014 | Hua | H04L 63/08 |
| | | | | 382/100 |
| 2019/0207949 A1 | * | 7/2019 | Parker | G06Q 20/384 |
| 2020/0210552 A1 | * | 7/2020 | Mcschooler | H04N 21/23418 |

* cited by examiner

*Primary Examiner* — Dao Q Ho
(74) *Attorney, Agent, or Firm* — KW Law, LLP

(57) ABSTRACT

Motion pictures or other digital media content can be encoded with visible, yet obscured, digital codes that can be optically detected by a camera or other automated image processing device. If a code is recognized in captured media content, further capture, playback and/or distribution can be halted, as desired. Because the code is visible (albeit hidden) in the digital imagery itself, capture by another camera or other optical device will not typically negate the usefulness of the code. That is, the code is visibly present within the imagery itself, so subsequent capture of the video imagery will also capture the code, thereby allowing for detection and/or prevention.

8 Claims, 2 Drawing Sheets

AUTOMATED PIRACY DETECTION

PRIORITY CLAIM

This application claims priority to U.S. Provisional Application Ser. No. 62/786,542 filed on Dec. 30, 2018, which is incorporated herein by reference.

TECHNICAL FIELD

The following discussion generally relates to automated detection of digital content piracy. More particularly, the following discussion relates to computing systems, devices and automated processes to automatically detect piracy of movies and other digital media content.

BACKGROUND

Piracy of movies and other digital media content continues to be a widespread problem. Production and distribution of motion picture content, in particular, is very expensive, so movie producers and distributors typically take stringent precautions to prevent unauthorized copying and distribution of their valuable content. Generally, movies nowadays are released to theaters as data files that can be transmitted via a satellite or network data link for digital playback. The content is generally encrypted prior to release and transmission using a secret key so that only the recipient theater is able to decrypt and present the movie to the public.

Occasionally, however, legitimately decrypted content is still pirated for public or private redistribution and viewing. Occasionally, for example, an unauthorized party will place a camera in a theater during a legitimate presentation to record some or all of the decrypted playback. Although quality will often suffer in such recordings, the content can nevertheless be captured and released to the Internet and/or used for other unauthorized purposes.

It is therefore desirable to create devices, systems and automated processes to technologically prevent unauthorized capture and use of movies or other digital media. Other desirable features and characteristics will become apparent from the subsequent detailed description and the appended claims, taken in conjunction with the accompanying drawings and this background section.

BRIEF DESCRIPTION

Various embodiments relate to different automated processes, computing systems, devices and other aspects of a data processing system that provides improved detection and/or prevention of pirated digital content. Prior to distribution, the content is encoded with an obscured visible code that is unobtrusive to a viewer of the program but that is nevertheless detectable using digital image processing techniques. Encoded content may be recognized by a camera device that is capturing the content, if desired, and/or the encoded content recorded by the capture device may be subsequently recognized by a playback device. By placing obscured codes in the content itself, improperly captured content can be readily identified, even if the improper capture was purely analog or visual, without copying the underlying digital content of the pirated presentation. Moreover, the codes can be customized to further identify the place and/or time that the improper content was captured, thereby further assisting in the recovery of pirated content and the prevention of continued piracy. Various embodiments may be modified and/or augmented in any manner, and a number of example embodiments are described below.

Some embodiments provide an automated process to automatically detect a pirated copy of a digital video program by an image capture device, a playback device or another computing device having a processor and a memory. The automated process suitably comprises: recognizing, by the processor of the computing device, a digital code that is visible in the captured imagery of the digital video program; upon recognizing the digital code, transmitting the digital code from the computing device to a remote processing system via a digital network; and in response to a subsequent message from the remote processing system indicating that the captured imagery is the pirated copy of the digital video program, suspending further processing of the captured imagery of the digital video program by the computing device.

Other embodiments relate to a data processing system having a processor and a memory. The processor executes instructions that are stored in the non-transitory memory to perform an automated process that detects pirated content in captured video imagery. The automated process suitably comprises: recognizing, by the processor of the, a digital code that is visible in the captured imagery of the digital video program; upon recognizing the digital code, transmitting the digital code to a remote processing system via a digital network; and in response to a subsequent message from the remote processing system indicating that the captured imagery is the pirated copy of the digital video program, suspending further processing of the captured imagery of the digital video program.

Other embodiments relate to a data processing system comprising a processor and non-transitory storage to store computer-executable instructions that, when executed by the processor, perform an automated process. The automated process suitably comprises: receiving and storing a plurality of digital codes, wherein each of the digital codes is digitally modulated into a different copy of a motion picture so that the digital code is visually detectable during playback of the motion picture from the modulated copy; subsequently receiving a message via a digital network from a computing device that identifies one of the digital codes recognized in imagery captured from playback of the modulated copy of the motion picture; in response to the message, comparing the digital code in the received message with digital codes previously stored in the database and, if the digital codes match, responding to the computing device with an instruction to discontinue further processing of the imagery captured form the playback of the modulated copy of the motion picture. Further embodiments may be able to identify a theater that presented the different copy of the motion picture that is modulated with the digital code identified in the received message.

Various embodiments relate to automated processes executed by any number of different client and/or server devices. The processes may be implemented using programming instructions that are stored in memory or other storage, and that are executed by a processor or similar computing hardware of the device.

Other embodiments relate to various devices each having a processor, memory or other digital storage, and an interface to a digital network. Software, firmware or other programming instructions to perform various functions are stored in the digital storage for execution by the processor.

Still other embodiments relate to data processing systems in which one or more client and/or server computing devices under the control of computing hardware interact with each other through electronic communications that are transmitted across the Internet or another digital network.

These and other example embodiments are described in increasing detail below.

DRAWING FIGURES

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

According to various embodiments, movies and/or other digital media content are encoded with visible, yet obscured, digital codes that can be optically detected by a camera or other automated image processing device. If a code is recognized in captured media content, further capture, playback and/or distribution can be halted, as desired. Because the code is visible (albeit hidden) in the digital imagery itself, capture by another camera or other optical device will not typically negate the usefulness of the code. That is, the code is visibly present within the imagery itself, so subsequent capture of the video imagery will also capture the code, thereby allowing for detection and/or prevention.

In a motion picture distribution system, for example, the digital data representing the media content can be appropriately encoded to adapt the intensity, color or other properties of certain pixels in a manner that is not readily detectable to the viewer, but that is nevertheless detectable by digital image processing. One or more codes can be encoded into various times and places within the content as desired. Codes may be present only at regular or irregular time intervals, for example, and may only persist for a very short time (e.g., on the order of a second or less) to further reduce the likelihood of recognition by a human viewer. Using the principles of steganography, any amount of information can be encoded into the digital imagery of the underlying content without being readily detectable to the viewer.

Figure 1:
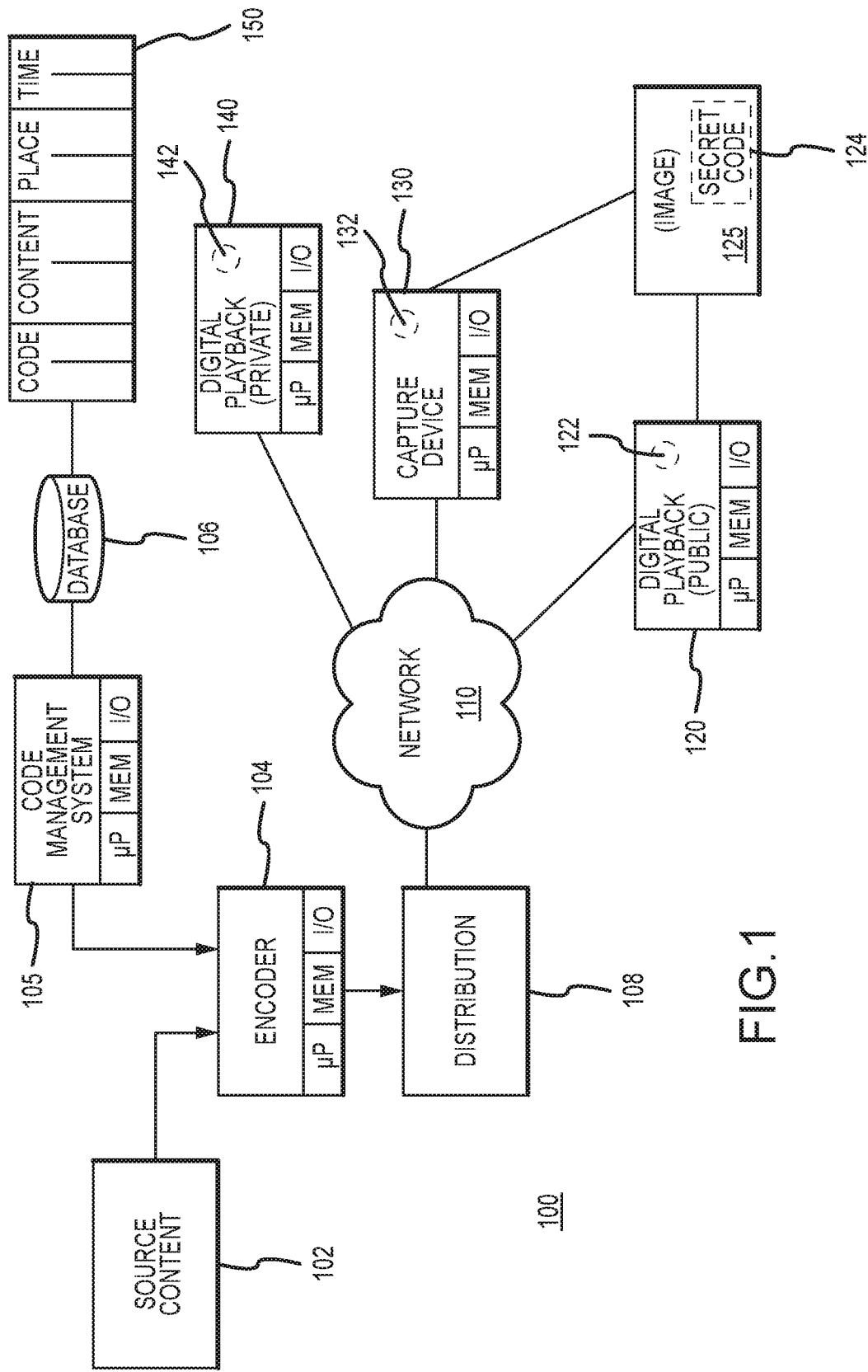
FIG. 1 illustrates an example of a data processing system to automatically detect piracy of a captured media program.

FIG. 1 shows an example data processing system 100 in which media content is encoded with visibly-detectable codes to facilitate subsequent automatic detection of pirated copies. As shown in FIG. 1, a movie, television program or other media program is initially received from a media source 102. The received digital content is suitably encoded with a code that is generated and managed by a code management system 105 that tracks assigned codes in a database 106. Database 106 suitably maintains a table or other structure 150 of assigned codes, along with appropriate information to track the identity of the content. Various embodiments may further assign codes based upon the approved playback times and/or locations, thereby providing for further detail in subsequently-identifying pirated content. That is, if a subsequently-discovered pirate media program includes a code that was initially assigned for a particular playback time and place, this information can be used to isolate and identify the offending party who created pirate program. In embodiments in which a digital code is used to encrypt the content prior to distribution, some or all of the encryption code could also be used to formulate a detection code. Other embodiments, however, may not relate the optical detection code to the digital encryption code, as desired.

Assigned codes are optically encoded into the media program in any manner. In the example of FIG. 1, an encoder system 104 suitably modifies pixel values of video frames included within the received content to include the digital code. Pixel intensity and/or color could be modified, for example. The code itself may appear as a QR or bar code in some implementations, although other embodiments could optically represent the code in any other manner. Code 124 may be of any size, location, duration and/or format as desired.

The particular frames and pixels that are chosen for encoding may be selected in any manner. The code does not need to be presented in contiguous pixels of the image; to the contrary, portions of the code may be spread across various locations of the image, or even multiple images, to prevent detection. Moreover, the code does not need to appear in each of the picture frames. Some encoders may modify only i-frames of the encoded video content, for example, or only present the code at certain times during playback. If the code is inserted every few minutes or so, for example, this may be frequent enough for some applications. The duration of the code presentation will also vary; presentation needs to be long enough so that subsequent image capture is likely to include the code, yet short enough to prevent distraction to legitimate viewers. Various embodiments may also elect to insert codes at times and places of the video in which the code is most detectable and/or least obstructive, as desired.

The visually-encoded program is distributed 108 for playback in any manner. In various embodiments, movies or other content can be distributed by very small aperture satellite (VSAT) links, or by public or private data links (e.g., via the Internet or another network 110). Various embodiments use electronic delivery over virtual private networks (VPNs) or other secure connections to deliver encrypted content to theaters and other playback stations, as desired.

The encoded content is received and presented by a playback system 120, as appropriate. Playback system 120 may be, for example, a digital projection system that includes processing circuitry, as well as non-transitory digital storage and suitable input/output interfaces as desired. Digital Cinema Initiatives, for example, has established a set of standards for digital cinema projection. In many implementations, the digital projector does not need to be modified to present the encoded content; indeed, the encoded imagery may be pressed onto conventional analog film, if desired.

Although FIG. 1 illustrates a system 100 in which a separate encoder 104 modifies the digital content, the visual codes could equivalently be processed by the digital playback device 122, if desired. That is, the theater projection system or other playback equipment 122 could include software, firmware or other logic 122 that optically modulates certain pixels in the output imagery, thereby reducing or eliminating the need to encode prior to distribution.

The presented imagery 125 therefore includes a visual code 124, as desired. As noted above, the code 124 is technically visible in the image, but ideally is difficult for a casual viewer to detect to reduce distraction. Nevertheless, if a recording of the encoded content is made by a camera or other capture device 132 located within the theater or other authorized viewing location, the recording made by the capture device 132 will contain the encoded imagery.

Codes within captured imagery may be processed in any manner. Hardware, software and/or firmware logic 132 within the capture device 130, for example, could be configured to recognize visual or other optical codes within the imagery, and to react appropriately. Additionally or alternately, the optical codes in captured imagery may be detected at a later date or time, thereby indicating that the video is unauthorized. If a captured video is uploaded to a website for distribution, for example, the codes can be recognized by a phone, tablet, computer, media player or other playback device 140 that includes code-detection logic 142, as desired. Upon recognition of unauthorized video, the recognition device can take appropriate action as desired.

Figure 2:
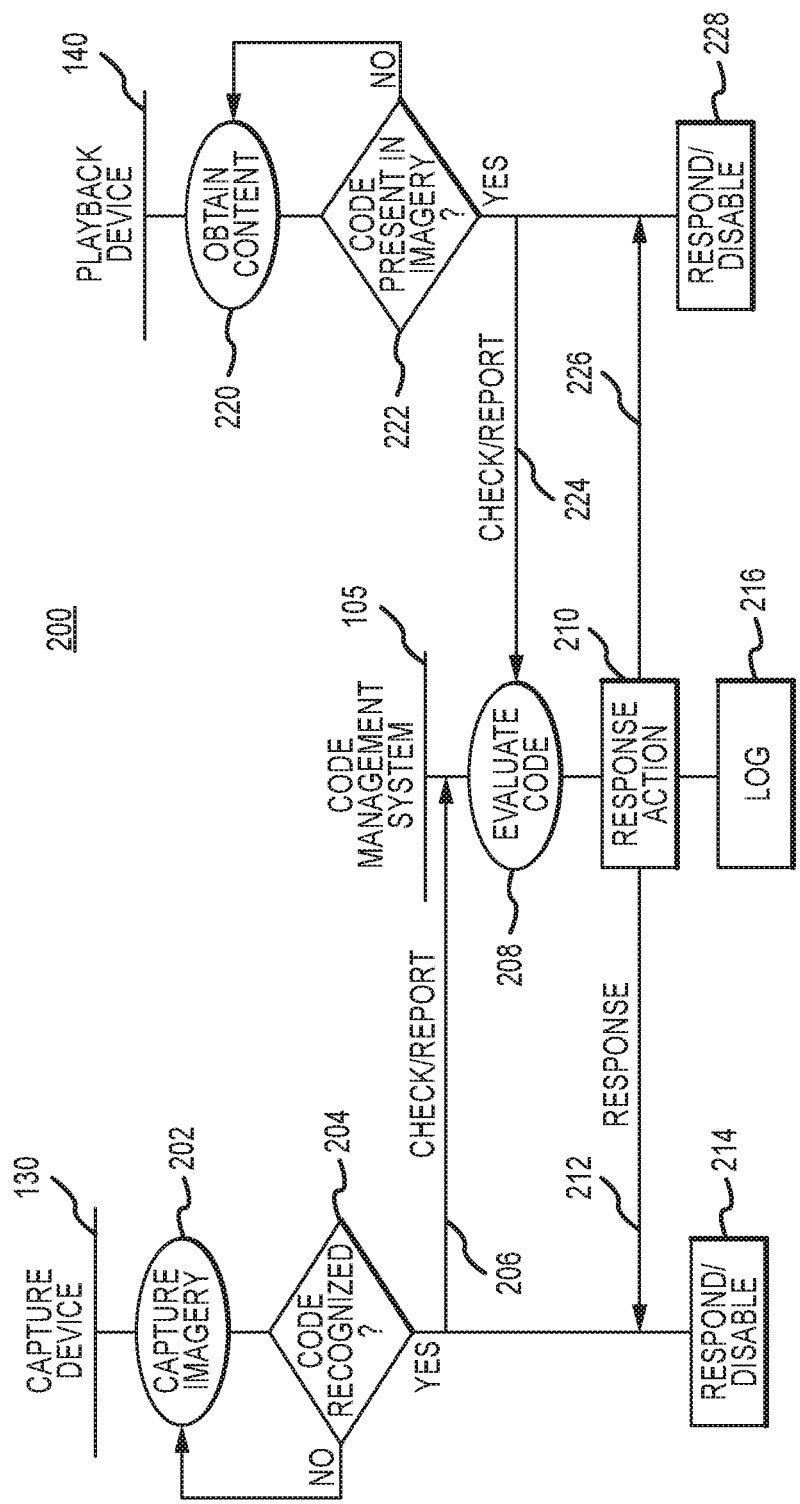
FIG. 2 is a diagram showing various example processes to automatically detect piracy of a captured media program.

FIG. 2 is a diagram showing various processes 200 that could be implemented within data processing system 100 to automatically identify unauthorized video. The various functions shown in FIG. 2 are implemented using programmed hardware within one or more computing devices. The functions performed by capture device 130, for example, could be performed by a processor under the control of programmed software or firmware that resides within a memory of the capture device 130. Similarly, the functions of a playback device 140 can be performed by a digital processor under the control of programmable software, firmware or other logic that physically resides in a memory or other non-transitory storage of playback device 140.

With reference now to FIG. 2, an example process 200 to detect unauthorized media content suitably includes the capture device 130 and/or playback device 140 identifying visual codes that are present within the captured imagery, and taking remedial actions as appropriate.

In the example of FIG. 2, capture device 130 captures or otherwise receives digital imagery as appropriate (function 202). A video camera, for example, typically captures a sequence of image frames that are encoded into a format for compressed storage, transmission and/or playback. In various embodiments, capture device 130 performs a digital analysis of one or more captured images to identify codes embedded therein. As noted above, codes may be located in any time or place, and may be implemented using steganography or other techniques. In various embodiments, pixel values are analyzed to recognize variations in pixel luminosity and/or intensity that are consistent with steganography. Pixel values targeted for analysis may be selected based upon pre-determined locations within the imagery. Alternately, pixels may be analyzed to recognize modulations that could represent piracy codes. Variations in pixel values within the image frame and/or between sequential image frames, for example, can identify optical codes embedded within the frame.

If capture device 130 identifies a code 124 within a captured image, various embodiments may allow the code 124 to be submitted to code management system 105 or the like. Mobile telephones or network-enabled cameras 130, for example, may have access to network 105 or the like for transmitting a reporting message 206, and for receiving a response 212 as appropriate. Even if capture device 130 does not have real-time access to network 105, programmed logic 132 within the device 130 itself may direct subsequent actions when coded video is captured (function 214). A camera or media capture application, for example, could include suitable code for recognizing codes in captured video, and for taking appropriate action when a coded video is identified. Appropriate actions could include, for example, discontinuing further capture of coded imagery, preventing access to previously captured video that includes the code, notifying a network service that a code has been recognized, providing the code to the service for further action), and/or taking other actions as appropriate. Various embodiments may notify the user of the device that a pirated video has been encountered, although other embodiments may prefer to report the code or otherwise take remedial actions without notifying the operator of the device that the piracy has been detected, if desired.

Even if capture device 130 is not configured to detect encoded video on capture, it may nevertheless be possible to prevent playback or distribution of unauthorized video content based upon the visual codes in the captured video imagery. To that end, any playback device 140 may be configured (e.g., using software or firmware logic) to analyze one or more of the video frames in content that is received (function 220) from the Internet or another source. Image analysis may involve monitoring and comparison of pixel values within and/or between frames, as described above, or in any other manner. If codes 124 are identified (function 222), then the playback device 140 can report the presence of a code to a central authority server 105 (function 224), and/or take other actions as appropriate. As noted above, the code authority server 105 may provide an instruction 226 directing that the playback device 130 disable playback and/or take further actions 228, as desired. Again, actions 228 may variously be performed under the direction of the central server 105 and/or at the direction of local programming 142, as appropriate.

The code management system 105 may be included within process 200, as desired. As noted above, some implementations will allow capture devices 130 and/or playback devices 140 to prevent capture, playback, copying or other actions with regard to coded video content on their own volition. Other embodiments, however, will allow communications between the capture device 130 and/or playback device 140 with a central code management server 105 to permit reporting of pirate video content, and/or to coordinate future actions by the devices 130/140 that are holding coded video content. Note that although FIG. 1 shows the code server 105 issuing codes prior to encoding and receiving subsequent reports of potential infringement, this is not required. Assigned codes 124 may be stored in a database 106, as desired, so that the code information 150 is able to be shared with different servers, as desired.

FIG. 2 shows one example process 200 that could be executed by a capture device 130, a code management system 105 and/or a playback device 140 to automatically detect pirated content using visual codes that are superimposed within the imagery itself. Although FIG. 2 illustrates code detection performed by both a capture device 130 and a playback device 140 for convenience, in practice only one device or the other might perform the code detection functions. FIG. 2 also illustrates that recognized codes are submitted (via messages 206 and/or 224) to a central processing system 105 for evaluation and further instruction. Equivalent embodiments could perform such functions locally on the capture or playback device, as desired.

As illustrated in FIG. 2, capture device 130 suitably captures digital imagery (function 202) that could include a pirated video stream modulated with one or more detection codes 124. Alternatively or additionally, a playback device 140 suitably obtains captured content (function 220) from a network service or other source, and analyzes the received content to identify codes 124 that may be present in the received imagery (function 222).

Codes may be recognized (functions 204, 222) as described above, for example by analyzing pixels at pre-determined locations within the captured imagery, and/or by identifying sharp boundaries between pixels that could represent codes of a pre-determined format.

If a code is recognized by the capture device 130 and/or playback device 140, the recognizing device sends a message 206, 224 to report the presence of visual codes 124 in captured media content. Such codes 124 may be checked against database 106 to evaluate the code (function 208) to determine whether the captured imagery is potentially problematic. If the code 124 did emanate from protected content, then server 105 transmits messages 212, 226 to capture device 130 or playback device 140 (respectively) to direct subsequent actions (function 210). In some embodiments, the other devices 130, 140 may be directed to disable further recording or other access to the unauthorized content, as desired. Codes 124 may be logged (function 216) for subsequent analysis, as desired. Some embodiments may also log an identifier of the capture or playback device that submitted the code 124, as well as date and/or time stamp information as desired.

Further, the presence of the code 124 in the captured video can be used to determine the source of the unapproved video. As noted above, codes 124 may be generated and encoded into content packages that are distributed to particular theaters or other authorized recipients. These codes may be specific enough to identify the particular time of playback, as well as the location of playback if desired. By checking the subsequently-received code 124 against the database 130 of issued codes, then, the central server 105 is able to recognize the location and/or time that the unauthorized video was made. This information, in turn, can be used to identify theaters and/or persons who are involved in the making of unauthorized content.

These general concepts may be amplified and/or modified in any number of different ways. The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A camera device comprising a processor and a memory, wherein the processor of the camera device is configured to execute instructions stored in the memory to perform an automated process that comprises:
    capturing, by the camera device, a copy of a digital video program that comprises captured imagery from a legitimate presentation of the digital video program;
    automatically recognizing, by the processor, a digital code that is visible in the captured imagery of the digital video program, wherein the digital code is embedded in the digital video program by modulating the intensities of a plurality of pixels of the digital video program;
    upon recognizing the digital code in the captured imagery, transmitting the digital code from the camera device to a remote processing system via a digital network; and
    in response to a subsequent message from the remote processing system indicating that the captured imagery is the pirated copy of the digital video program, the camera device suspending further processing of the digital video program and otherwise continuing processing of the digital video program by the media playback device.

2. The camera device of claim 1 wherein the digital code is embedded in the motion picture content by modulating the intensity of pixels of the motion picture content imagery.

3. The camera device of claim 2 wherein the recognizing comprises analyzing intensities of pixels of the captured imagery that visually represent the rendered motion picture content imagery.

4. An automated process to automatically detect optical piracy by a camera device having a processor and a memory, wherein the automated process comprises:
    capturing imagery of a digital video program from a legitimate presentation of the digital video program;
    automatically recognizing, by the processor of the camera device, a digital code that is visible in captured imagery of a digital video program, wherein the digital code is embedded in the digital video program by modulating the intensities of a plurality of pixels;
    upon recognizing the digital code in the imagery of the digital video program, the camera device transmitting the digital code to a remote processing system via a digital network and receiving a response message from the remote processing system; and
    if the response message from the remote processing system indicates that the digital video program is the pirated copy, the camera device suspending further processing of the digital video program and otherwise continuing processing of the digital video program by the media playback device.

5. The automated process of claim 4 wherein the digital code uniquely identifies one of a plurality of theaters that are presenting the motion picture being captured.

6. The automated process of claim 5 wherein the remote processing system maintains a database of digital codes that are associated with each of the plurality of theaters to thereby uniquely identify the particular theater that is presenting the captured motion picture.

7. The automated process of claim 6 wherein the digital codes are modulated into different copies of the motion picture content prior to distribution of the different copies of the motion picture to the plurality of theaters.

8. The automated process of claim 7 wherein the digital code is a steganography code.

* * * * *